US 7,730,207 B2

(12) United States Patent
Zhang et al.

(10) Patent No.: US 7,730,207 B2
(45) Date of Patent: Jun. 1, 2010

(54) ROUTING IN PEER-TO-PEER NETWORKS

(75) Inventors: Zheng Zhang, Beijing (CN); Qiao Lian, Beijing (CN); Yu Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1033 days.

(21) Appl. No.: 10/853,933

(22) Filed: May 25, 2004

(65) Prior Publication Data

US 2005/0223102 A1    Oct. 6, 2005

Related U.S. Application Data

(60) Provisional application No. 60/559,370, filed on Mar. 31, 2004.

(51) Int. Cl.
*G06F 15/16* (2006.01)
*G06F 15/173* (2006.01)

(52) U.S. Cl. .................. 709/242; 709/203; 709/205; 709/229; 709/238; 709/240; 709/243

(58) Field of Classification Search ............. 709/205, 709/203, 229, 238, 240, 242, 243
See application file for complete search history.

(56) References Cited

U.S. PATENT DOCUMENTS 6,560,636 B2    5/2003  Cohen et al.

| 2002/0035604 | A1* | 3/2002 | Cohen et al. | 709/205 |
| 2003/0126122 | A1* | 7/2003 | Bosley et al. | 707/3 |
| 2004/0054807 | A1* | 3/2004 | Harvey et al. | 709/243 |
| 2004/0088431 | A1* | 5/2004 | Carter | 709/240 |
| 2004/0215792 | A1* | 10/2004 | Koning et al. | 709/229 |
| 2005/0015511 | A1* | 1/2005 | Izmailov et al. | 709/238 |

FOREIGN PATENT DOCUMENTS

| EP | 1398924 | 3/2004 |
| WO | WO2005098863 | 10/2005 |

OTHER PUBLICATIONS

Zhang, Zheng, Shi, Shu-Ming and Zhu, Jing, "SOMO: Self-Organized Metadata Overlay for Resource Management in P2P DHT," IPTPS, 2003, pp. 1-5.
Rhea, et al., "Probabilistic Location and Routing", Proceedings IEEE Infocom 2002, The conference on computer communications 21st annual joint conference of the IEEE computer and communications societies, New York, NY, 2002, vol. 1, conf. 21, Jun. 23, 2002, pp. 1248-1257.

(Continued)

*Primary Examiner*—Tonia L Dollinger
*Assistant Examiner*—Anish Sikri
(74) *Attorney, Agent, or Firm*—Lee & Hayes, PLLC

(57) ABSTRACT

Routing in a peer-to-peer network is described. In an implementation, a method includes receiving at one of a plurality of nodes in a peer-to-peer network, an indication of a change in membership in the peer-to-peer network by another node in the peer-to-peer network. A report is broadcast that describes the change. The report is for receipt by each node referenced in a routing table included in the one node.

21 Claims, 9 Drawing Sheets

OTHER PUBLICATIONS

Rousskov, et al., "Cashe Digests", Computer Networks and ISDN Systems, North Holland Publishing. Amsterdam, NL, vol. 30, No. 22-23, Nov. 25, 1998, pp. 2155-2168.

Botros S et al., "Search in JXTA and Other Distributed Networks", Peer-to-Peer Computing, 2001, Proceedings, First International Conference on Linkoping, Sweden Aug. 27-29, 2001, Los Alamitos, CA, USA, IEEE Computer Society, US Aug. 27, 2001, pp. 30-35.

Broder, et al., "Network Applications of Bloom Filters: A Survey", May 2, 2003, Shortened preliminary version of a longer survey available at <<http://www.eecs.harvard.edu/~michaelm>>.

Xu et al., "Building Topology-Aware Overlays Using Global Soft-State", Proceedings of the 23rd International Conference on Distributed Computing Systems (ICDCS'03), 2003.

Xu et al., "RITA: Receiver Initiated Just-in-Time Tree Adaptation for Rich Media Distribution", Hewlett-Packard Laboratories: Internet Systems and Storage Lab, 2003.

Rowstron, et al., "Pastry: Scalable, decentralized object location and routing for large-scale peer-to-peer systems" Middleware 2001: IFIP/ACM International Conference on Distributed Systems Platforms, Nov. 12, 2001, pp. 1-22.

* cited by examiner

ROUTING IN PEER-TO-PEER NETWORKS

RELATED APPLICATIONS

The present application claims priority under 35 U.S.C. §119(e) to U.S. Provisional Application No. 60/559,370, filed Mar. 31, 2004.

TECHNICAL FIELD

The present invention generally relates to peer-to-peer networks, and more particularly relates to routing in peer-to-peer networks.

BACKGROUND

Peer-to-peer networks continue to increase in popularity due to many desirable features, such as adaptation, self-organization, load-balancing, fault-tolerance, low cost, high availability, scalability, and ability to provide a large pool of resources. For example, peer-to-peer networks have emerged as a popular way to share large amounts of data, such as by peers downloading songs that are referenced as being available for download from another peer in the peer-to-peer network.

Traditional architectures that are utilized to provide the peer-to-peer networks, however, have not addressed the ever increasing numbers of members, i.e. nodes, which may form the system. For instance, a current example of a peer-to-peer network has provided more than 230 million downloads to more than four million users. The number of members, however, is expected to continually increase such that an ultra-large system may be encountered that has over one trillion nodes. Therefore, even though current architectures may address a system having a large number of nodes, these current architectures may still prove inadequate when employed in an ultra-large system.

To locate a particular resource in a peer-to-peer network, for instance, each node in the network may reference one or more other nodes in the network to locate a node having the particular resource, e.g. a particular item of data. Therefore, a series of "hops" may be employed as a request is routed from one node to another until the particular item is located. As the number of hops increases, the use of hardware and software resources of the nodes, as well as the network resources of the system also increases. Thus, the increased number of hops may result in an inefficient use of the resources of the system as well as increase the amount of time utilized to locate the particular item.

Accordingly, there is a continuing need for improved routing in peer-to-peer networks.

SUMMARY

Routing is described in which a routing table is utilized to route messages (e.g., requests for a particular resource and responses to the request) in the peer-to-peer network. The routing table may be updated via broadcasting to update entries in the routing table that reference nodes in the peer-to-peer network. In an implementation, a maintenance budget utilized to maintain the routing tables of each node is distributed over multiple segments of the resource space of the peer-to-peer network by building dense routing table entries for each segment. Therefore, the overall maintenance budget for maintaining the routing tables may be reduced, which frees the hardware, software, and network resources of the peer-to-peer network to provide the desired message routing functionality.

In an implementation, a method includes receiving at one of a plurality of nodes in a peer-to-peer network, an indication of a change in membership in the peer-to-peer network by another node in the peer-to-peer network. A report is broadcast that describes the change. The report is for receipt by each node referenced in a routing table included in the one node.

In another implementation, a method includes determining, on a node for inclusion in a peer-to-peer network, available resources of the node for communicating in the peer-to-peer network. A routing table is formed on the node, based on the determination, for routing requests in the peer-to-peer network.

In a further implementation, a method includes compressing data that describes entries in a routing table utilizing an iterative bloom filter by one of a plurality of nodes in peer-to-peer network. A communication is formed to communicate the compressed data to another said node.

BRIEF DESCRIPTION OF THE DRAWINGS

The same numbers are used throughout the disclosure and figures to reference like components and features.

DETAILED DESCRIPTION

Overview

Routing in a peer-to-peer network is described. As previously described, a smaller number of hops is desirable such that a fewer number of forwarding nodes may be utilized, thereby lowering overall bandwidth consumption. Routing techniques are described that reduce the number of hops utilized to find a resource in an ultra-large system (i.e. 1 trillion nodes), but with a low and controllable per-node maintenance budget.

Routing tables are utilized by a node to reference other nodes in the peer-to-peer network. Traditional maintenance of routing tables, however, may utilize an unacceptably large amount of hardware, software, and network resources in an ultra-large system. Traditional maintenance techniques, for instance, utilized probing such that entries in the routing tables were updated by sending requests and receiving responses to the requests to determine whether the node referenced by the table is currently available in the system. Although the amount of hardware, software, and network resources utilized for each probe is relatively small, when this resource usage is aggregated across the entire system, the amount may become significant. Therefore, an ultra-large system may suffer a significant loss in functionality when using these traditional maintenance techniques. In the maintenance techniques described herein, the maintenance budget utilized to maintain routing tables may be distributed over multiple segments of the resource space of the peer-to-peer network by building dense routing table entries for each segment. Thus, the overall maintenance budget for maintaining the routing tables may be reduced, which frees the hardware, software, and network resources of the peer-to-peer network to provide the desired functionality of routing requests and responses to the requests. In this way, routing tables may be maintained which utilize fewer hops in an ultra-large system without resulting in an unacceptable maintenance budget. Further discussion of dense routing entries and maintenance of routing tables may be found in relation to FIG. 3.

Additionally, although previous O(log N) routing techniques that were utilized have found success in current systems, the current accepted small base (i.e., the parameter b in $O(\log_b N)$) in previous techniques is no longer adequate for ultra-large systems. For example, when the number of nodes "N" in the system is one trillion, the worst case hop count is 20 (when b is 4 with approximately 60 entries) when utilizing a traditional O(log N) routing technique. In an implementation, which is described in greater detail in the "Routing Performance" section, the average routing in a system having one trillion nodes that employs the routing techniques described herein is reduced to 5.5 hops.

Exemplary Environment

Figure 1:
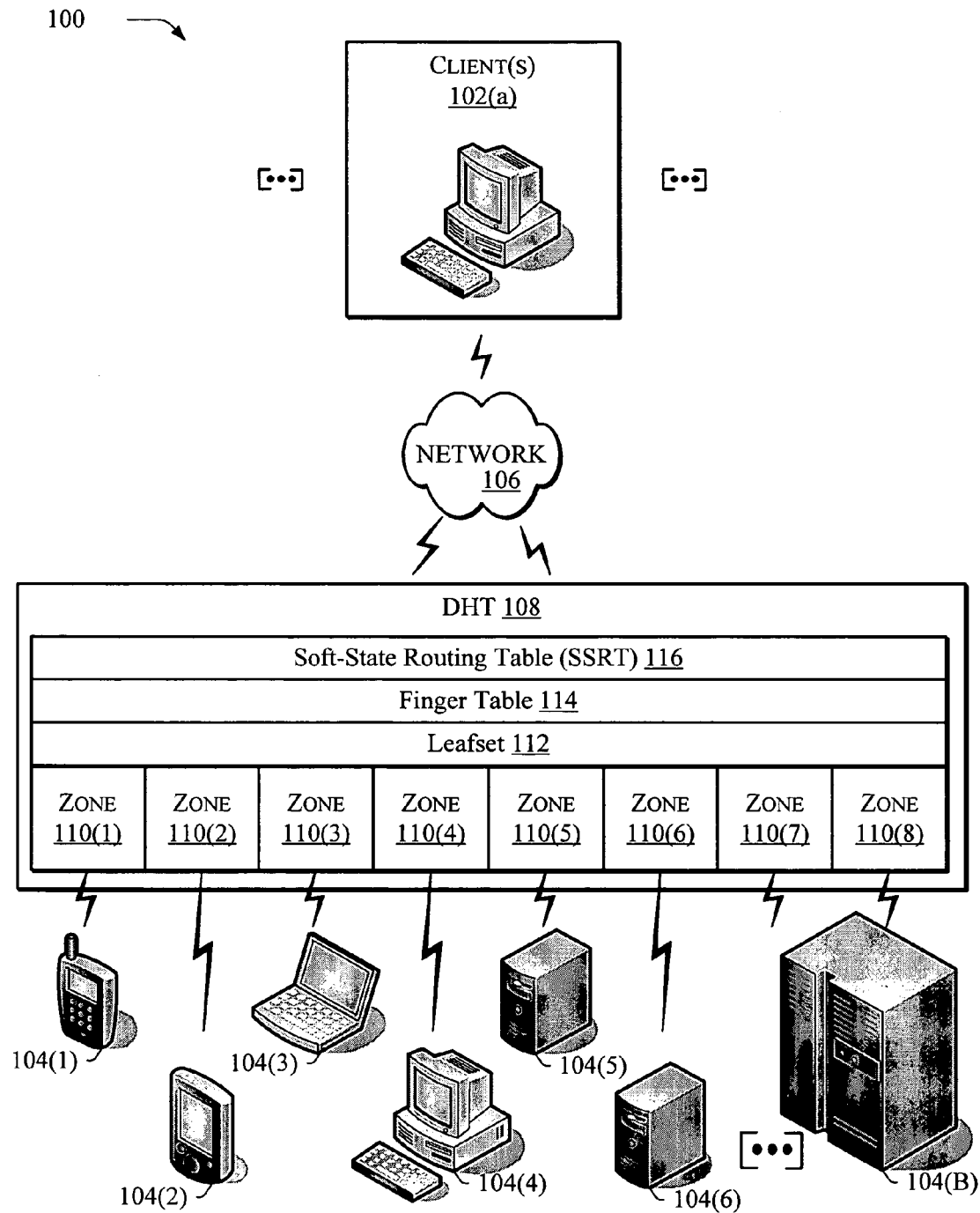
FIG. 1 is an illustration of an exemplary implementation showing an environment that is configured to provide a peer-to-peer network.

FIG. 1 is an illustration of an exemplary implementation showing a system 100 that is configured to provide a peer-to-peer network. The system 100 includes a plurality of clients 102(a), where "a" can be any integer from one to "A", which is communicatively coupled to a plurality of computing devices 104(1)-104(B) over a network 106. In this implementation, the plurality of clients 102(a) and the plurality of computing devices 104(1)-104(B) each represent a node in the network 106. A node may be thought of as a connection point to transmit data, such as a redistribution point that provides data to other nodes and/or an end point that is a destination and/or source of data.

The plurality of clients 102(a) and the plurality of computing devices 104(1)-104(B) may be configured in a variety of ways. For example, the clients 102(a) and computing devices 104(1)-104(B) may be configured as computers that are capable of communicating over the network 106, such as a wireless phone (e.g., computing device 104(1)), a tablet computer (e.g., computing device 104(2)), a notebook computer (e.g., computing device 104(3)), a desktop computer (e.g., computing device 104(4)), servers (e.g., computing devices 104(5)-104(6)), a mainframe computer (e.g., computing device 104(B)), and other computing devices, such as a mobile station, an entertainment appliance, a set-top box, and so forth. Further discussion of an exemplary computing device may be found in relation to FIG. 10. Thus, the plurality of clients 102(a) and computing devices 104(1)-104(B) may range from full resource devices with substantial memory and processor resources (e.g., personal computers, television recorders equipped with hard disk) to low-resource devices with limited memory and/or processing resources (e.g., traditional set-top boxes). The clients 102(a) may also relate to a person and/or entity that operate the client. In other words, client 102(a) may describe a logical client that includes a user and/or a machine.

The network 106 is configured as a peer-to-peer network. A peer-to-peer network allows nodes of the network 106 to access shared resources located on each of the nodes, i.e. the plurality of clients 102(a) and the plurality of computing devices 104(1)-104(B). Examples of peer-to-peer networks, which have been known and used in the past, include the following:

Freenet, as described by I. Clarke, B. Wiley, O. Sanberg, and T. Hong in "Freenet: A Distributed Anonymous Information Storage and Retrieval System," *Proc. Int. Workshop on Design Issues in Anonymity and Unobservability*, Springer Verlag, LNCS 2009, 2001;

Chord, as described by I. Stoica, R. Morris, D. Karger, M. F. Kaashoek, H. Balakrishnan in "Chord A Scalable Peer-to-peer Lookup Service for Internet Applications," *Proc. ACM SIGCOMM'01*, San Diego, Calif., USA, 2001;

CAN, as described by S. Ratnasamy, P. Francis, M. Handley, R. Karp, and S. Shenker in "A Scalable Content-Addressable Network," *Proc. ACM SIGCOMM'01*, San Diego, Calif., USA, 2001;

Pastry, as described by A. Rowstron and P. Druschel in "Pastry: Scalable, Decentralized Object Location and Routing for Large-Scale Peer-to-Peer Systems," *IFIP/ACM Int. Conf. Distributed Systems Platforms (Middleware)*, 2001; and Tapestry, as described by B. Y. Zhao, J. Kubiatowicz, and A. D. Joseph in "Tapestry: An Infrastructure for Fault-tolerant Wide-Area Location and Routing," *Technical Report No. UCB/CSD*-01-1141, Univ. of California, Berkeley.

Peer-to-peer networks may offer a variety of features, such as redundancy and fault tolerance. For instance, data stored in the peer-to-peer network may gradually spread as the data is replicated by nodes of the peer-to-peer network. Thus, data may become highly redundant in a peer-to-peer network, which may result in increased reliability and availability of the data.

A variety of resources may be exchanged using a peer-to-peer network, such as data, processing cycles, data storage, and so on. Thus, the peer-to-peer network may be utilized to leverage the collective power of the plurality of clients 102(a) and the plurality of computing devices 104(1)-104(B). Peer-to-peer is a communications model in which each node, i.e. "member", may communicate directly with another member and/or through a mediating computing device. The clients 102(a) and the computing devices 104(1)-104(B) may communicate over the network 106 by using messages, such as requests and responses. Although seven computing devices 104(1)-104(B) are illustrated, a wide variety of computing devices may be implemented in the environment. Additionally, the plurality of clients 102(a) may also be configured as "peers", i.e. members, in the peer-to-peer network.

The network 106 includes a distributed hash table (DHT) 108 which acts as an interface to route messages between the clients 102(a) and the plurality of computing devices 104(1)-104(B). The DHT 108 may be thought of as a distributed version of a hash table data structure that stores (key, value) pairs. For example, the key may correspond to a file name and the value may correspond to contents of the file. Each peer in the network 106, e.g. computing devices 104(1)-104(B), stores a subset of (key, value) pairs. The DHT 108 is therefore utilized to find a node responsible for a corresponding key. In other words, the DHT 108 maps the key to the node to route messages between the clients 102(a) and the plurality of computing devices 104(1)-104(B). A variety of services may be built "on-top" of the DHT 108, such as file sharing services, archival storage services (e.g., Web archiving), databases, naming systems, service discovery, application-layer multicast, event notification, chat services, rendezvous-based communication, query and indexing, data publishing/subscriptions, and so on.

The DHT 108 partitions resources provided by the plurality of computing devices 104(1)-104(B) into a plurality of zones 110(1)-110(8), i.e. "buckets". Each of the plurality of zones 110(1)-110(8) may be thought of a portion of the total resources shared in the system 100. For example, as previously described the DHT 108 associates resources with keys. The key is hashed to find a particular one of the plurality of zones 110(1)-110(8) using the DHT 108. The plurality of zones 110(1)-110(8) may be provided in a variety of ways. For example, zone 110(1) is represented pictorially in FIG. 1 as being provided by computing device 104(1). Likewise, zones 110(2), 110(3), 110(4), 110(5), 110(6) are each provided by respective computing devices 104(2), 104(3), 104(4), 104(5), 110(6). Additionally, a computing device may provide more than one zone, which is represented pictorially in FIG. 1 as zones 110(7), 110(8) as being provided by computing device 104(B).

The DHT 108 is shown as employing a three-layer architecture that includes a leafset 112, a finger table 114, and a soft-state routing table 116 (SSRT). The leafset 112 is utilized to guarantee the integrity of the key space. For example, the leafset 112 may employ consistent hashing to divide the resource space and a node's response space into one or more of the plurality of zones 110(1)-110(8) as previously described.

The finger table 114, i.e. the middle layer, may be utilized to implement a prefix-based routing algorithm, such as an O(log N) prefix routing algorithm, where "N" is the total number of nodes. Each node, for instance, may include a finger table 114 that has entries, i.e. fingers, which point to other nodes in the system 100. The entries of the finger table 114 may follow a logarithmic function to reference successively "further" nodes in the system 100. The entries of the finger table 114 may be constructed by flipping a bit of a corresponding node's ID and then pointing to the node which keeps the resultant keys. Periodic beaconing may be employed for updating both the leafset 112 and finger table 114 entries, such as by using a probing mechanism. Thus, the leafset 112 and the finger table 114 may provide O(log N) performance to the DHT 108.

The SSRT 116, when the churn rate $\mu$ is small (e.g., when nodes join or leave the system 100), gives a listing of the nodes that are members of the system 100. Thus, the SSRT 116 may be utilized to quickly locate a desired node. The construction of the SSRT 116 may be accomplished by utilizing the fingers of all the nodes in the system 100, which form a broadcast graph with adequate redundancy. For purposes of the present discussion, broadcasting refers to dissemination of data in a graph in which one vertex, called the originator, distributes data to all other vertices by placing a series of calls along the edges of the graph. Once informed, other vertices aid the originator in distributing the message. A broadcast graph is a graph in which broadcasting can be accomplished in "$\lceil \log_2 n \rceil$" time units.

Figure 2:
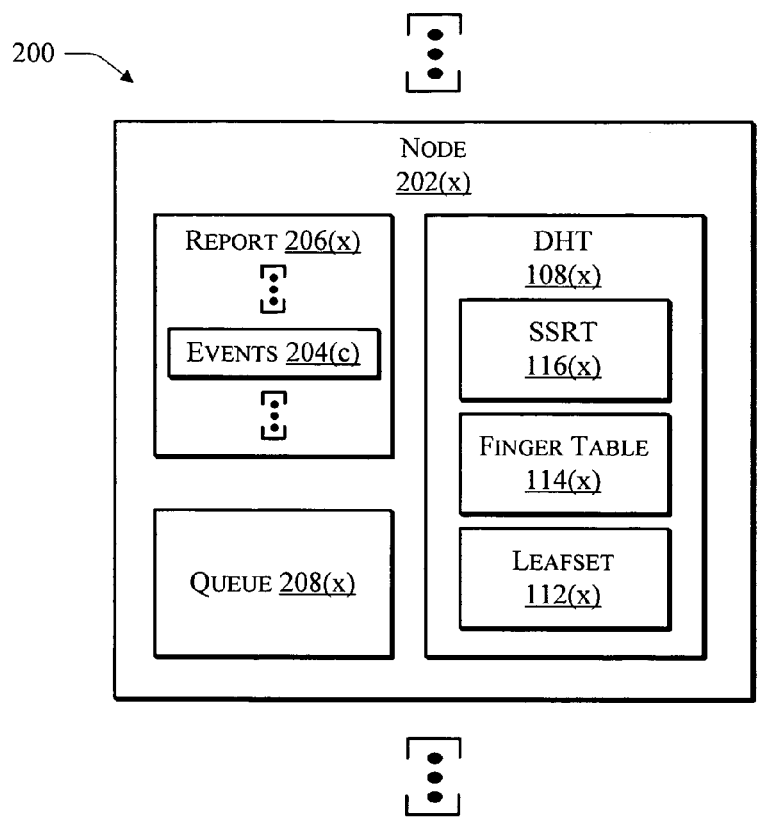
FIG. 2 is an illustration of a system in an exemplary implementation in which a plurality of nodes of a peer-to-peer network is shown in greater detail.

FIG. 2 is an illustration of a system 200 in an exemplary implementation in which a plurality of nodes 202(x), where "x" can be any integer from one to "X", of a peer-to-peer network is shown in greater detail. Node 202(x) may be the same as or different from the nodes in the system 100 of FIG. 1, e.g. computing devices 104(1)-104(H) and clients 102(a). The node 202(x) is illustrated as including a corresponding DHT 108(x) having a leafset 112(x), finger table 114(x) and SSRT 116(x) which are numbered to indicate that these tables are versions of the DHT 108, leafset 112, finger table 114, and SSRT 116 of FIG. 1 for that particular node 202(x).

The node 202(x) may monitor membership of other nodes of the leafset 112(x) through receipt of one or more events received from the respective node that describe the change in membership, such as a "join" or "leave" event. When the node 202(x) observes a change in membership, the node 202(x) inserts one or more of a plurality of events 204(c), e.g. join or leave event, into a report 206(x). The report 206(x) is broadcast in parallel through each finger of the node 202(x) described by the finger table 114(x) at a predefined broadcast interval. Each of the plurality of nodes 202(x) may perform the same operation by building reports that describe events the node has observed and also describing events flooded from other nodes in the system 200, minus those events that have already been described by the node 202(x). Thus, a flooding algorithm is provided that offers adequate redundancies (O(log N)) to deliver reliable broadcast with a high propagation speed (on average O(log N).

To control maintenance cost, events may be buffered internally in a queue 208(x) if a quota is exceed. Additionally, the DHT 108 may adaptively deal with robustness by using one or more rules. For instance, to ensure that SSRT 116(x) entries are of a high quality (e.g., the SSRT 116(x) entries describe the current membership of the system 100 of FIG. 1), "leave" events, which describe that a particular node has left the system 100, are sent out before other events, e.g. "join" events. In this way, the system 100 is kept aware of when resources are not available from particular nodes that have left the system before being notified of when another node has joined the system 100, which is utilized to reestablish system 100 equilibrium. Further discussion of system equilibrium may be found in the "Adaptation" section.

At a steady state, the number of valid SSRT 116(x) entries M can be found by solving the following equation:

$$Q = 4\mu \cdot E \cdot M \cdot \log N$$

where E is the size of an event. In an implementation, the event is 34 bytes and includes data describing an event type, a timestamp, an IP address and a node ID. The constant "4" in the equation accounts for bandwidth cost in both sending and receiving, as well as one join and one leave operation for each session.

Thus, the DHT 108(x) may make extensive use of aggregation, which is exercised in both the temporal (e.g., batch events into reports) and spatial (e.g., interact with O $\log_2$N) nodes) domains. Additionally, by utilizing broadcasting to communicate changes in membership, even though a full cluster is maintained, when there is no event to be communicated, there is little traffic in the network which results in increased network efficiency.

DHT

In this section, use of the DHT's 108 architecture will be described in a dynamic environment for a system having an ultra-large scale. The DHT 108 provides the effect of $O(\log_b N)$ routing with very large b (e.g., b equal to approximately 4,000), which does not require active probing of each of the entries. As previously described, while bandwidth consumption may be small to send and/or respond to a probe to update entries in the DHT 108, sending and responding to a large amount of probes may result in a significant overhead when aggregated across all or a portion of the system 100 of FIG. 1. Additionally, decreasing probing frequency may not be desirable because a miss is costly to detect, e.g. a miss may result in a random IP hops to locate the desired resource in the system.

In the following implementation, the performance of a b=4,000 prefix-based routing when N is equal to one trillion is replicated. For purposes of the following discussion, the broadcasting budget Q is 5 kb/s and the churn rate $\mu$ is assumed to be 1/(3 hours). These parameters permit a full cluster of 4K size to be built utilizing the DHT 108. It should be apparent that a variety of broadcasting budgets and churn rates may be addressed by the routing techniques described herein.

An example of a routing technique that may be utilized to deliver such performance includes two components. The first component involves the building of a crossbar for a sub-region, instead of the whole resource space, using one quarter of the broadcast budget, i.e. Q/4. The second component is the designing of a mechanism to use four such crossbars to revolve 40 bits when routing. Each of these components is described in turn in the following sections.

Building a Sub-Region Crossbar

Total resource space T may be divided into $t/2^i$ regions for some integer "i". For example, the division may be such that, on average, each region M contains approximately one thousand nodes. For an arbitrary node x, let R(x) be the region that it belongs to and let beamers(x) be the subset of x's fingers that fall within R, i.e. that point to other nodes in that region R. Thus, for all nodes that share the same R, the corresponding beamers collectively form a broadcast graph that covers R and has a significant degree of redundancy. By applying the same broadcast protocol in the DHT 108 through beamers, each of these nodes may be supplied with a corresponding SSRT that covers the corresponding region R. The bandwidth cost may be calculated as follows: $4\mu \cdot E \cdot M \cdot \log M$. Thus, for the current implementation, where E=34B and $\mu$=1/(3 hours), the bandwidth cost is about one kb/s. In this way, the first component is met, namely using less that Q/4 to build a cluster that can resolve the shortest 10 base-2 finger range with one hop. In essence, the sub-region cluster can be regarded as a leafset of 1K nodes. For example, if a lookup key falls within this range, one hop will be sufficient to find the desired resource.

R may be estimated in a variety of ways. For example, each node may compute an average zone size $\bar{z}$ using the information of its corresponding leafset. The next node may then make its estimation of region R as 10 bits further than $\bar{z}$. As previously stated, the beamers are the fingers within the region estimation. The boundary may be further enforced by dropping join-events sent by nodes that lie outside the region estimation. Thus, the SSRT of a node will not be polluted by entries from neighboring regions.

Figure 3:
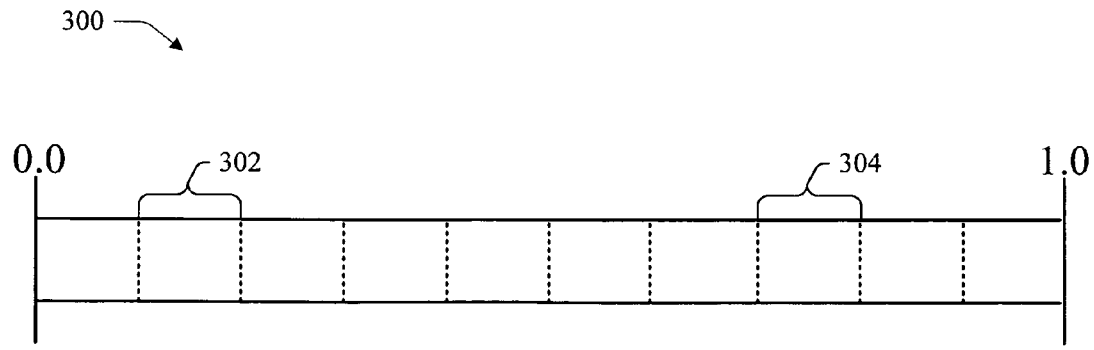
FIG. 3 is an illustration in an exemplary implementation showing a snapshot of a plurality of soft state routing tables of a plurality of nodes in a system in a one-dimensional logic key space.

FIG. 3 is an illustration showing a one-dimensional logical key space 300 that depicts SSRTs of several nodes in a system implemented in a peer-to-peer network. A first region 302 of the one-dimensional logical key space 300 may be described by an SSRT of a first one of the plurality of nodes 202(x) of FIG. 2, a second region 304 of the one-dimensional logical key space 300 may be described by the SSRT of a second one of the plurality of nodes 202(x) of FIG. 2, and so forth. The dashed lines illustrated in FIG. 3 represent theoretical region division lines. Thus, as shown in FIG. 3, the SSRTs are populated by entries covering a corresponding region of a corresponding node.

Resolving Multiple Blocks

For purposes of the following discussion, the ID length of each node is 160 bits and a ten bit segment of an ID will be referred to as a "block". As previously described, the ID may be thought of as the address of the node in the peer-to-peer network. A prefix-based routing with b=4K resolves lookup one block at a time. In the current example of a system with one trillion nodes, there are a total of four ten-bit blocks to be resolved.

Routing continues in the regional cluster by matching one bit of the address at a time through the fingers, until the destination is within the range covered by the shortest ten fingers. At this point, the SSRT delivers access to the resource in one hop. Effectively, these last ten fingers may be expanded into $2^{10}$ SSRT entries to extend this access. In other words, the fingers located in other leading blocks are expanded into SSRT entries for inclusion in the same prefix-range.

Figure 4:
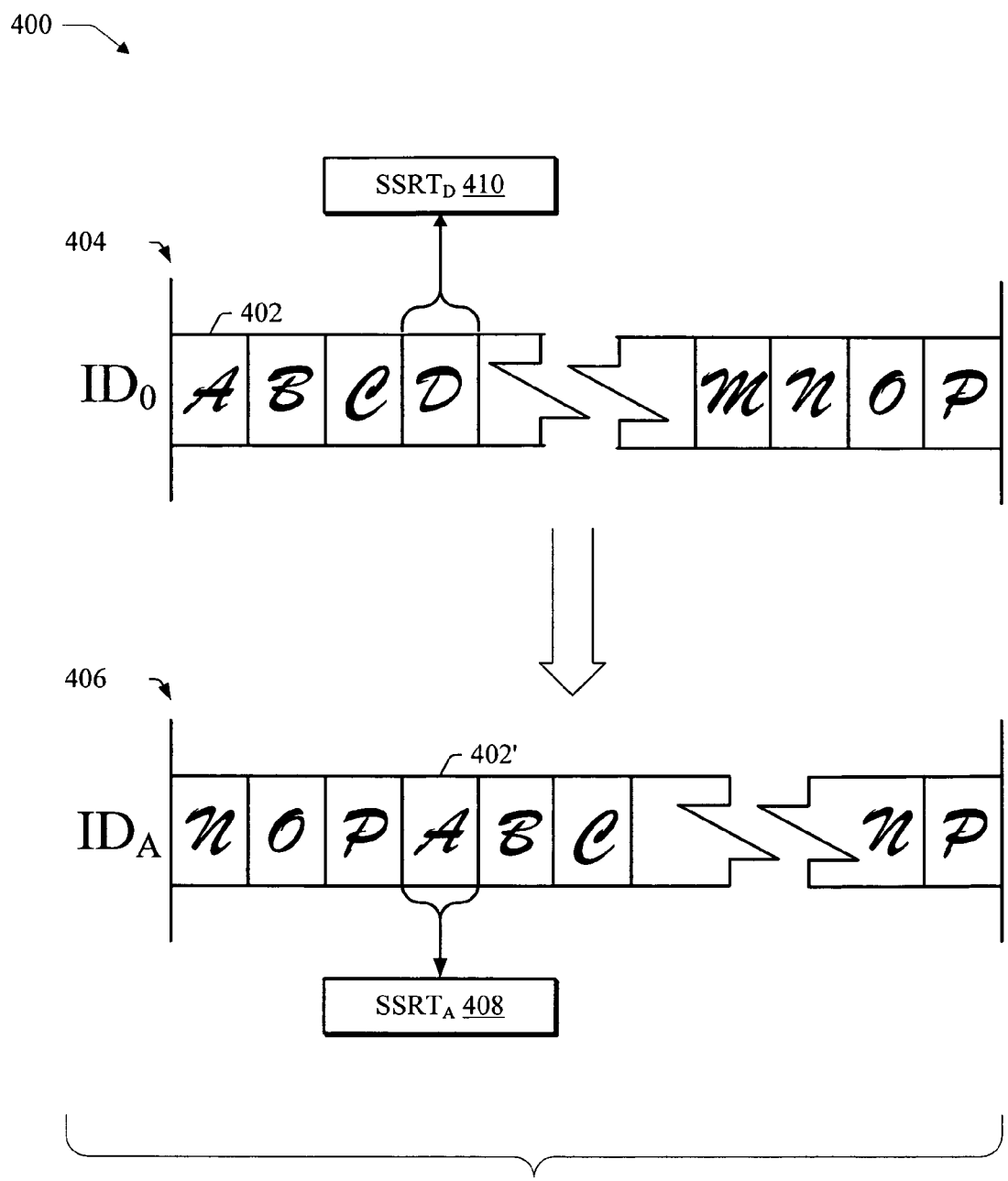
FIG. 4 is an illustration of an exemplary implementation showing the building of entries in a soft state routing table for a given block by rotating an identifier and building another ring.

In a one trillion nodes system, each node has, on average, 40 fingers. For purposes of the following discussion, $Ring_0$ will be used to denote the base ring. Additionally, for purposes of the following discussion, the ID of a node is divided into blocks of ten bits which are named alphabetically as shown in FIG. 4. Although ten bit blocks are shown, blocks may utilize different amounts of bits. For instance, each block may have two or more bits, may have five or more bits, and so on.

For example, consider block A 402 in FIG. 4. In order to build SSRT entries of block A 402, the ID 404 is rotated to the right to obtain a new $ID_A$ 406 in which the block A 402' is at the $4^{th}$ block. Each node uses $ID_A$ 406 to join another ring denoted as $Ring_A$. $Ring_A$ is built in an identical fashion as $Ring_0$, with its own leafset and $O(\log_2 N)$ fingers. On top of that, the sub-region cluster algorithm is similarly applied. Therefore, a node acquires an $SSRT_A$ 408 in $Ring_A$ of 1K size, and the entries are nodes whose $ID_A$ share with it the leading three blocks (i.e., N|O|P) but vary in the $4^{th}$ block, i.e. block A 402'.

The relationship of ID 404 and $ID_A$ 406 means that these four nodes, in turn, are those that share the last three blocks of ID but vary in block A in $Ring_0$. Therefore, the task of expanding the 10 base-2 fingers in block A into $2^{10}$ SSRT entries is accomplished. Similar arrangements may be performed for blocks B, C, and D (e.g. $SSRT_D$ 410). Each ring helps to build SSRT entries that cover the corresponding block.

Altogether, four rings are built in this example. For purposes of the following discussion, SSRT entries for block A are denoted as $SSRT_A$, SSRT entries for block B are denoted as $SSRT_B$, and so on. The final SSRT is a combination of the four smaller SSRTs (e.g., $SSRT_A$, $SSRT_B$, $SSRT_C$, $SSRT_D$) and is approximately 4K in size. Routing using the DHT may proceed in which bits are matched as aggressively as possible for proceeding through intermediate hops.

Routing

Figure 5:
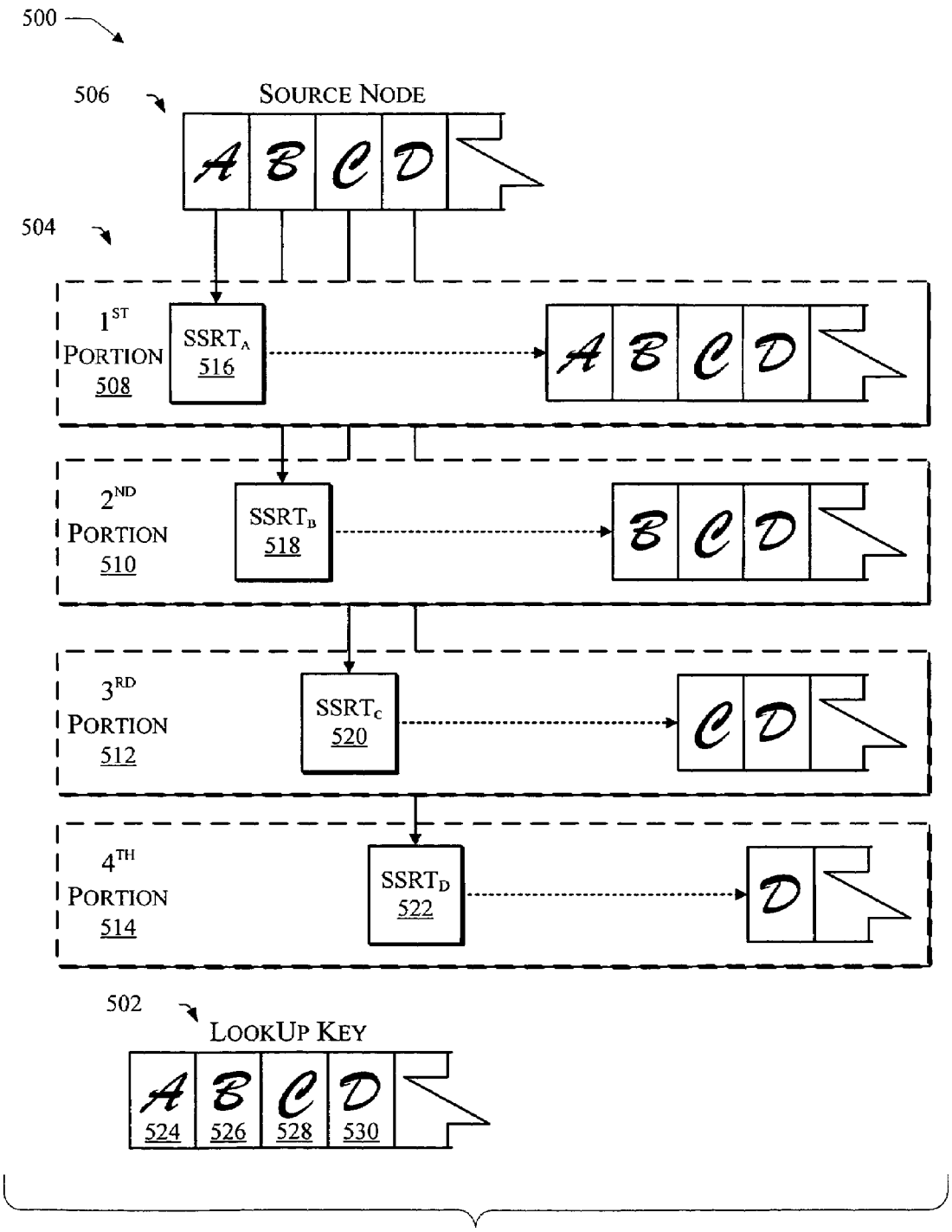
FIG. 5 is an illustration of an exemplary implementation showing routing using a soft state routing table of the rings described in relation to FIG. 4.

FIG. 5 is an illustration of an exemplary implementation 500 showing routing as performed by using the SSRT table that is located on each node of the system 100 of FIG. 1. A lookup key 502 is utilized in conjunction with a SSRT 504 to locate a node having a particular address 506. As described in the previous section, the SSRT 504 includes entries that references nodes having addresses which have varying levels of similarity.

The SSRT 504, for example, may be composed of a plurality of portions 508, 510, 512, 514 having respective SSRT 516, 518, 520, 522 entries. The first portion 508 includes $SSRT_A$ 516 entries that reference each node having the different addresses that can be described in block A 524. The second portion 510 includes $SSRT_B$ 518 entries that reference each node having addresses that match, one to another, for address block A. The second portion 510, however, references each node having a respective different address that can be described in block B 524. In other words, all the entries in $SSRT_B$ 518 have a respective block A that matches, one to another, but has a different block B. Likewise, the third portion 512 includes $SSRT_C$ 520 entries that reference each node having respective address blocks A and B that match, one to another. The third portion 512, however, references each node having each of different addresses that can be described in block C. Therefore, all the entries in $SSRT_C$ 520 have respective matching blocks A and B but a different block C. Finally, the fourth portion 514 includes $SSRT_D$ 522 entries that reference each node having matching address blocks A, B and C. The fourth portion 514, however, references each node having one of different addresses that can be described in block D. Thus, all the entries in $SSRT_D$ 518 have matching blocks A, B, and C but a different block D, which provides "one hop" routing to the respective node. In this way, each SSRT that is maintained by the respective nodes may provide describe different hierarchies of nodes having similar addresses to provide efficient routing in a peer-to-peer network.

The SSRT 504, for instance, may be utilized to find a particular resource by examining the SSRT 504 using the lookup key 502. If blocks A 524, B 526, C 528, and D 530 of the lookup key 502 match corresponding blocks A, B, C, and D described in the $SSRT_D$ 522 entries of the SSRT 504 table, the SSRT 504 may be utilized to route the request directly to the corresponding source node 506, i.e. in one hop.

In another example, if blocks A and B 524, 526 of the lookup key 502 match blocks A and B of the SSRT 504 but not block C, then the lookup key 502 is compared with the $SSRT_C$ 520 to hop to a corresponding node that describes nodes having matching blocks A, B, and C. The corresponding node may then have an SSRT having a fourth portion that may be utilized in one hop to locate the source node 506. Similar lookups may be performed using the first and second portions 508, 510 based on how much of the lookup key matches the entries in the SSRT 504. Thus, each node includes a SSRT that may be utilized to quickly locate a node in an ultra-large system.

Figure 6:
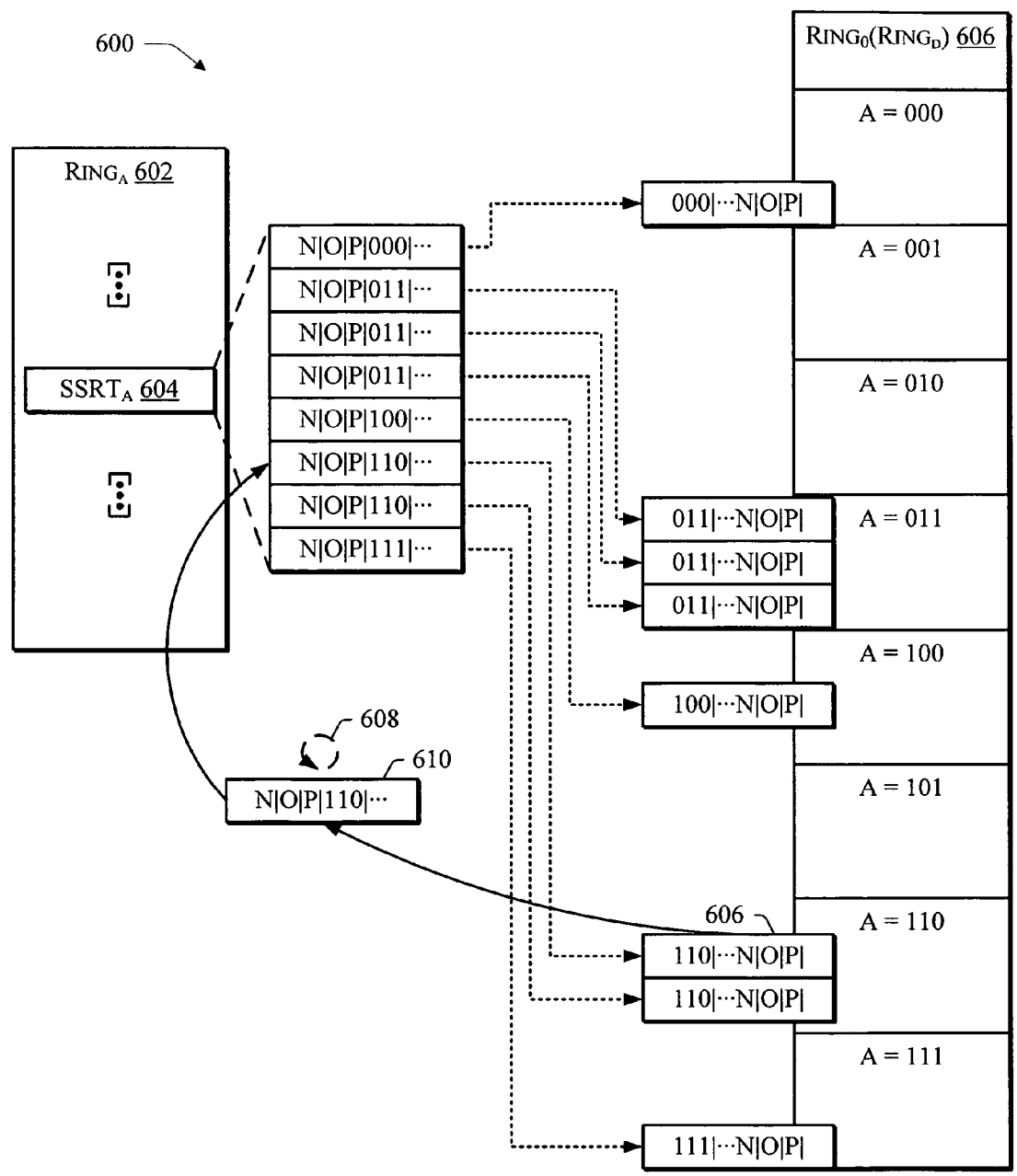
FIG. 6 is an illustration of an exemplary implementation showing a portion of a soft state routing table and the generation of an entry in the soft state routing table.

FIG. 6 is an illustration of an exemplary implementation 600 showing routing as performed by using the SSRT table of FIG. 6 that is located on each node of the system 100 of FIG. 1. As previously described in relation to FIG. 4, the SSRT may be constructed from a plurality of rings that reference locations of each node in a peer-to-peer network by rotating the identifier of each node. For example, $ring_A$ 602 may have an $SSRT_A$ 604 having a plurality of entries. In this example, each entry in the $SSRT_A$ 604 has an initial three blocks (which are illustrated in FIG. 6 as "N|O|P") that match, one to another. The fourth block "A" in the $SSRT_A$ 604 describes each location in the system having a corresponding address for that fourth block. To construct the entries for the $SSRT_A$ 604, the ID, i.e. address of the node in the peer-to-peer network, is "rotated". For example, address 606 "110| . . . N|O|P|" is rotated 608 to form ID 610 "N|O|P|110| . . . " which is included in the $SSRT_A$ 604. In this way, an SSRT may be constructed that reduces the amount of hops that are performed to locate a desired resource in an ultra-large system.

Routing Performance

In the above described implementations, routing resolution in higher blocks takes slightly more than one hop for each block, except for the destination that is within the range covered by the shortest ten fingers. For example, consider the one trillion node system as shown in FIG. 5. When node x initiates a lookup, the destination key k is random. Let $addr_A(k)$ be the A block of k (i.e., the ten most significant bits), therefore $addr_A(k)$ has $2^{10}$ possible values. As previously described, the 1K $SSRT_A(x)$ entries are nodes whose IDs share the last three blocks of ID(x), but vary at block A. Because node ID is random, it is not guaranteed that the "A" blocks of $SSRT_A(x)$ entries also contain the $2^{10}$ possible values of $addr_A(k)$.

The above described problem is equivalent to dividing the complete resource space into approximately one thousand bins, and then nodes in $SSRT_A(x)$ as well as x itself are balls randomly dropped into these bins. The lookup in block A may be resolved with one hop if and only if the bin indexed by $addr_A(k)$ is not empty, as shown in FIG. 6. Similarly, if the space is divided into 512 bins and $addr_A(k)$ points to a bin that is not empty, then the nine most significant bits may be resolved using $SSRT_A(x)$, leaving one more hop to resolve using an ordinary "finger" from a finger table before starting to use an $SSRT_B$ of another node.

Let $P_i$ be the probability that at least i bits can be resolved. To calculate $P_i$, the space is divided into $2^i$ bins and $2^{10}$ balls are dropped into the space. $1-P_i$ is thus $(1-2^{-i})^{1024}$, in other words a bin can be randomly picked in which no balls are found, which can be approximated to be $e^{-2^{\wedge}(10-i)}$, so $P_i=1-e^{-2^{\wedge}(10-i)}$.

At this point, the expected number of hops can be calculated. Let $p_i=P_i-P_{i+1}$ for $i \leq 9$, where $p_i$ is the probability that exactly i bits are resolved using $SSRT_A$. The following may be observed:

$$H = 1 \cdot p_9 + 2 \cdot p_8 + 3 \cdot p_7 \ldots$$
$$= 1 \cdot (p_9 - p_{10}) + 2 \cdot (p_8 - p_9) + 3 \cdot (p_7 - p_8) \ldots$$
$$= e^{-1} + e^{-2} + e^{-4} \ldots$$
$$= 0.52$$

Therefore, resolving block A (or any of the other blocks except the very last block, which takes one hop) takes 1.52 hops on average. Thus, if N is equal to one trillion, the average routing will take approximately 5.5 hops.

Performance has been described in reference to a one trillion node system. In general, the average performance is bounded by $(\lceil \log_{1024} N-1 \rceil) \cdot 1.52+1$. Therefore, if N=256,000, the worst-case performance is 2.02 instead of 2.52 with high probability. For instance, $SSRT_A$ can simply resolve 8 bits with an expected hop count of 1.02. At this point the full crossbar built with remaining ten fingers will deliver the final hop. Similarly, if N=256 million, the performance is bound by 3.54 hops with high probability.

Maintenance Cost and Robustness

As previously described, the total cost of maintaining a one thousand node regional cluster in one ring with a churn rate $\mu=1/(3 \text{ hours})$ is approximately 1 kb/s. Maintaining an SSRT of four rings utilizes approximately four times that cost. Thus, each node will consume a total of 4 kb/s for SSRT maintenance. Other costs include periodical probing among leafset members and fingers of all four rings, which has a relatively small cost by comparison. It should be noted that this gives an average routing performance in a one trillion node system of 5.5 hops.

Adaptation

Peaks in bandwidth consumption may still be encountered even when average bandwidth consumption described in the previous exemplary routing techniques conforms to the bandwidth budget Q. Therefore, as previously described in relation to FIG. 2, events may be buffered internally in the queue 208(x) of FIG. 2 until additional bandwidth becomes available. A variety of other adaptation techniques may also be employed to control the quality of the SSRT when dynamic changes in the system occur. For example, adaptation techniques may be utilized to gracefully degrade routing performance under stress and return to normal routing performance afterwards.

An exemplary first such adaptation technique addresses a high churn rate $\mu$ that will also stabilize the system into equilibrium under a steady condition. This adaptation technique involves the "pruning" of redundant events that are included in reports to adaptively control broadcast traffic. The net result is a well-maintained, high quality SSRT. Further discussion of configuration of the report such that redundant events are not included may be found in relation to FIG. 8.

An exemplary second such adaptation technique builds upon the first adaptation technique where the SSRT becomes a crossbar covering a portion of the total resource space as shown in relation to FIG. 3. The first and second adaptation techniques may be combined to shape the SSRT included on each node such that when combining the SSRT of each of the nodes, a multi-level architecture is obtained by combining the two optimizations. For example, a two level architecture may be employed in which the first level spans an entire resource space and the second level provides regional crossbars. In another example, a four level architecture may be employed as described in relation to FIG. 5. With this hybrid approach, O(1) can be reached for a system having a large number of nodes and yet without exceeding the bandwidth budget Q.

In an implementation, let "eSSRT" denote a subset of SSRT entries whose state is "online." Filtering may be utilized to ensure that the state is as accurate as possible at the expense of eSSRT size. That is to say, a low false-positive rate is achieved with a larger number of false-negative entries. The rational is that a "miss" is generally more costly than a "hit".

To accomplish this goal, filtering may utilize a variety of rules, examples of which are shown below:

1. Leave events are sent with higher priority to ensure a low false-positive rate.
2. If the event is not going to change a state, it is not propagated.

The second rule may be implemented by using a state machine. For example, if an event type is consistent with the current state as indicated by the state machine, the timestamp is updated without a change to the current state; and the state is negated otherwise. In the latter case, a has-sent field is also negated. For instance, an entry whose state is "online" and has-sent is false, upon receiving a "leave" event the state is changed to "offline," and has-sent is set to true. In other words, this particular event does not need to be propagated further. Thus, redundant messages are pruned away with the help of buffering the events.

By utilizing these techniques, the system will reach equilibrium automatically because the buffered events will help to prune those events received in the future. When churn rate $\mu$ is high, leave events may occupy most of the bandwidth quota at the beginning of the adaptation with any "overflow" join events being buffered. At a later point in time, the buffered join events will cancel leave events, when received, thereby giving share to release join events. When churn rate $\mu$ becomes steady, the share of network and node resources used to send join and leave events will eventually be approximately equal. Thus, the higher the churn rate, the more effective this approach will be in reducing the overall use of network resources in the peer-to-peer network. Secondly, the buffered events will be released when the bandwidth quota becomes available again, allowing the system to weather event storms (e.g., rapid changes in membership resulting in a plurality of events being communicated at a particular point in time) and rapidly return to normal performance levels afterwards. In this way, a robust technique is provided.

Set-Reconciliation

One practical issue for any DHT routing technique that utilizes a large routing table is how to pull a returning peer's routing table(s) current, in what may be referred to as "set-reconciliation". For example, in the previously described routing techniques, an issue arises in how to obtain an up-to-date SSRT when joining the peer-to-peer network, since both the leafset and finger table of the returning node may be newly constructed each time the node joins the peer-to-peer network.

The SSRT, for instance, may be persisted in stable storage at the background, and its membership list (e.g., the entries having <ID, IP> pair of all other nodes) includes whatever a node has learned throughout its past history. A node that is completely new to a system may copy a SSRT at the time it first joins. Therefore, when the system has operated for a sufficient period time, the membership list set in SSRT will be generally consistent across the entire system.

When a departed node returns to the peer-to-peer network (e.g., joins the peer-to-peer network), however, the joining node may not be aware of the state of peers recorded in its corresponding SSRT. Therefore, the joining node may reset each of the entries in the SSRT to the state of offline, and then try to learn from one or more of the existing nodes in the peer-to-peer network. For example, if the SSRTs of the two nodes are synchronized with each other, the existing node can send a vector with each bit of the vector representing the state of other peers from the existing node's SSRT. When churn rate $\mu$ is high and number of online entries is small, for instance, it is practical to copy the eSSRT. For example, it may take approximately eight seconds to transfer approximately 4K entries, each having 32 bytes over a 128 kb/s link. This may not be a robust solution, however, when churn rate $\mu$ is low or in an ultra-large system.

For more efficient communication of data describing the SSRT entries, the data may be compressed with a bloom filter to reduce the amount of bandwidth utilized to update the SSRT. In this way, efficient communication may be provided in ultra large systems. A bloom filter is a probabilistic algorithm that is used to test membership in a large set by using multiple hash functions into a single array of bits. The bloom filter, for instance, may work effectively when space/bandwidth is an issue and a small error is tolerated.

In a bloom filter, for instance, a list of n items may be compressed into m bits, i.e. b=m/n per item, in which "b" represents a "filter parameter". For each item, a set of hash functions whose range fall into [0 . . . m] are applied and set the corresponding bit in the m-bit vector. A side-effect of the bloom filter is that a false-positive may occur, i.e. a receiving node may faultily include some elements that lie outside the original list. Such probability is shown to be $(0.6185)^b$, and if m=8n then the probability is just over 0.02.

If the size of an item is E bytes, then instead of sending a list of nE bytes, with b=8 size of the filter is 8n bits (i.e. n bytes), resulting a 1/E compression ratio. For example, to transfer a node ID and IP address, but not the timestamp, E may be equal to approximately 32 bytes, and thus the resulting 1/32 compression rate is considerable. In an implementation, the first protocol applies the bloom filter over the entries that are not online. The false-positive of the bloom filter would then mean that 2% of the online nodes are recorded as offline at the receiving end.

Accuracy may be further improved in another implementation by using an "iterative bloom filter". For example, a sending node, i.e. a node that sends data to update a receiving node's SSRT, first computes a filter of online nodes P (PRESENT) with a smaller filter parameter a. The sending node then identifies the set of false positive nodes A ⊂ P, and applies a supplement filter with filter parameter b. Both filters are then sent to the receiving node, i.e. the node requesting the data to update the SSRT. Qualitatively speaking, this results in a conservative approach because some of the online nodes will be missed. Statistically speaking, the number of such entries is the same as the single-level bloom filter because the error rate of bloom filter depends on the filter parameter only.

Figure 7:
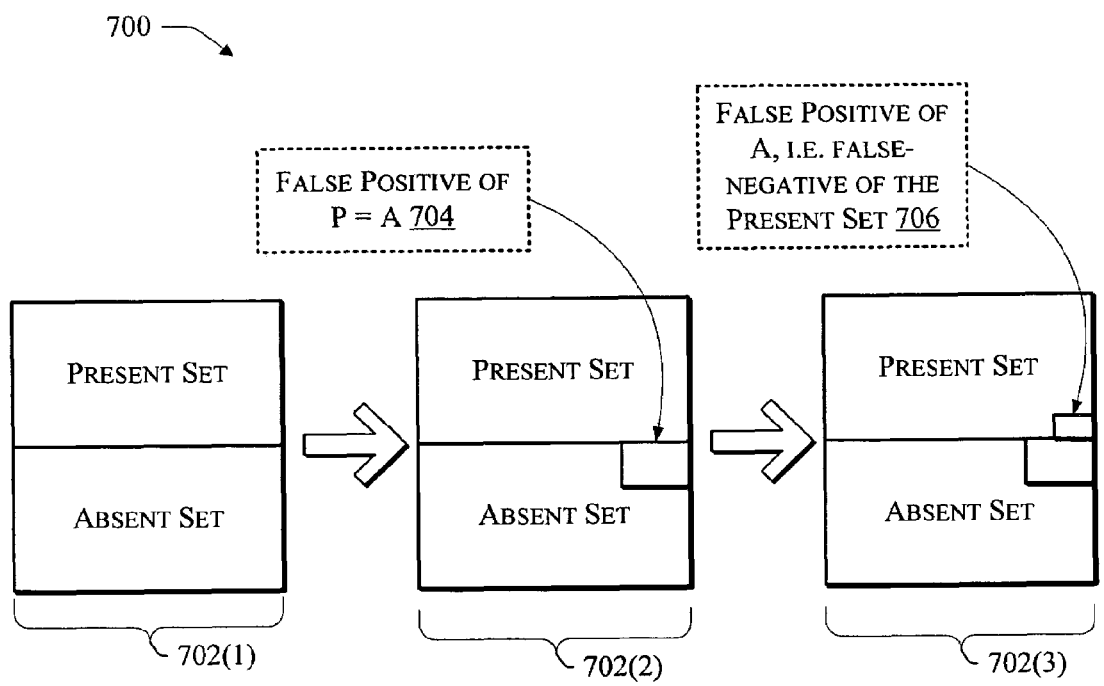
FIG. 7 is an illustration of an exemplary implementation showing an iterative bloom filter.

An exemplary iterative bloom filter 700 is depicted in FIG. 7. The iterative bloom filter 700 is depicted as including a set of three bloom filters 702(1)-702(3). P704 and A706 are the set of false-positive entries of each filter.

To compute whether the iterative approach will give a bandwidth savings, let $N_a$ and $N_p$ be number of offline and online nodes, respectively. For a single-level b bits bloom filter, total message size is $bN_a$ bits. The first filter of the iterative method has message size $aN_p$. The size of A, i.e. the number of false-positive entries, is $N_a(0.6185)^a$. Therefore the supplement filter has size $N_a b(0.6185)^a$, resulting a total message size S which may be represented as follows:

$$S = N_a b(0.6185)^a + aN_p$$

To get a minimal message size, the following is observed:

$$\frac{dS}{da} = N_p - 0.4805 \cdot b \cdot N_a (0.6185)^a = 0$$

Because "a" is a non-negative integer, the equation may be broken down into the following two cases:

$$\begin{cases} a = \log_{0.6185} \frac{N_p}{0.4805 N_a b} & N_p < 0.4805 N_a b \\ a = 0 & N_p >= 0.4805 N_a b \end{cases}$$

In the above exemplary implementation, when the filter parameter b is equal to eight and for cases when $N_a$ is smaller than 25% of $N_p$, a single-level bloom filter may be adopted. Exemplary pseudo-code for this is shown as follows:

```
OnSetReconcileRequest( )
    N_p = SSRT.OnlineSet.Size
    N_a = SSRT.OfflineSet.Size
    if (N_p < 0.4805*N_a*b)
        a = log(N_p/(0.4805*N_a*b))/log(0.6185)
        F1 = BloomFilterPack(SSRT.OnlineSet, a)
        P = BloomFilterUnpack(SSRT,F1)
        A = P-SSRT.OnlineSet
```

-continued

```
        F2 = BloomFilterPack(A, b)
        Send(F1, F2);
    else
        F1 = BloomFilterPack(SSRT.OfflineSet, b)
        Send(F1, 0)
OnSetReconcileAck(F1, F2)
    foreach(entry ∈ SSRT)
        if InBloomFilter(entry, F1)
            if F2==0 or not InBloomFilter(entry, F2)
                entry.status = online
```

In the above set reconciliation pseudo-code, b is predefined (e.g., 8), and entries of SSRT at the receiving end all start with state offline.

Exemplary Procedures

The following discussion describes updating and configuring an SSRT that may be implemented utilizing the previously described systems and devices. Aspects of each of the procedures may be implemented in hardware, firmware, or software, or a combination thereof. The procedures are shown as a set of blocks that specify operations performed by one or more devices. The procedures are not necessarily limited to the orders shown for performing the operations by the respective blocks.

Figure 8:
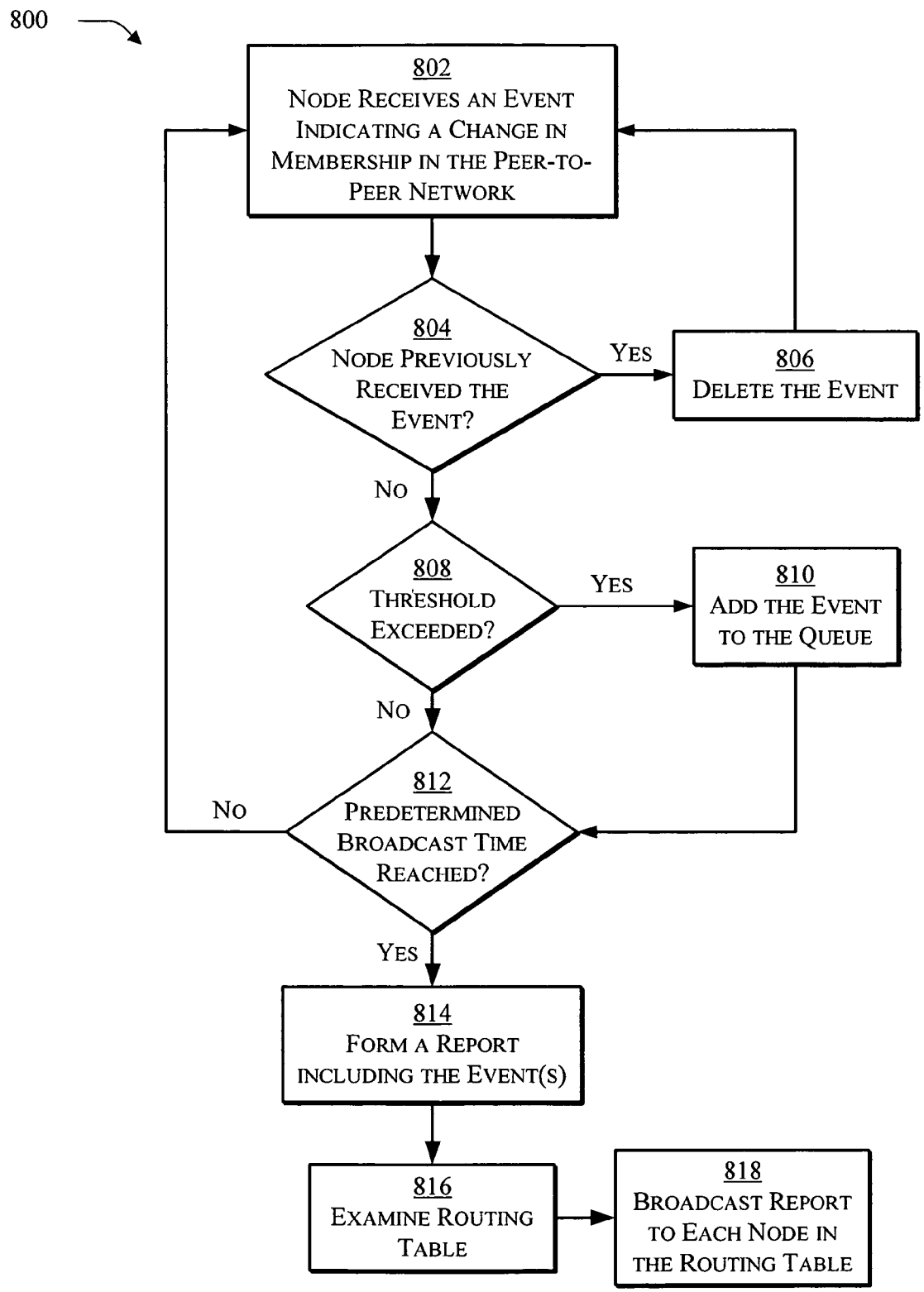
FIG. 8 is a flow diagram illustrating a procedure in an exemplary implementation in which a node forms and communicates a report that describes events received by that node that indicate a change in membership in a peer-to-peer network.

FIG. 8 is a flow diagram illustrating a procedure 800 in an exemplary implementation in which a node forms and communicates a report that describes events received by that node that indicate a change in membership in a peer-to-peer network. At block 802, the node receives an event indicating a change in membership in the peer-to-peer network. For example, a first node may choose a random identifier ID and perform a lookup to determine if that identifier is already included in the peer-to-peer network. The identifier may be thought of as the address of the first node in the peer-to-peer network. If the identifier ID is not already included in the peer-to-peer network, the first node may then locate a "successor" node having the next highest identifier, denoted as ID', and notify the successor node that the first node has joined the peer-to-peer network. Notification may be performed by communicating a "join" event to the successor node.

At decision block 804, a determination is made as to whether the node has previously received the event. If the node has previously received the event (block 804), the event is deleted (block 806). Thus, in this example events are not communicated more than once by the node. In another example, a threshold may be utilized to communicate the events a predetermined number of times to provide desired redundancy in the system implementing the peer-to-peer network.

If the node has not previously received the event (block 804), then at decision block 808 a determination is made as to whether a threshold has been exceeded for communicating events to other nodes. If the threshold has been exceeded (block 808), then the event is added to a queue (block 810). In this way, the procedure 800 may control maintenance costs in the peer-to-peer network by communicating no more than a predetermined number of events over a given period of time.

If the threshold has not been exceeded (block 808) or after the event is added to the queue (block 810), a determination is made at decision block 812 as to whether a predetermined broadcast time has been reached. For instance, each node in a peer-to-peer network may broadcast events received by that node at different predetermined intervals to "spread-out" the cost in network resources that are utilized to communicate the event. If the predetermined broadcast time has not been reached (block 812), the procedure 800 returns to block 802 to receive additional events, if any.

When the predetermined broadcast time for that node has been reached (block 812), a report is formed that includes the events. For example, the node may aggregate events received from a plurality of nodes such that a single communication is sent having the events. The event may be obtained from the queue of events that were stored at block 810 and/or from other storage that has been utilized to store events received at the node.

At block 816, a routing table is examined to determine where the report is to be broadcast. At block 818, the report is broadcast in parallel to each node referenced in the routing table. The routing table and the broadcast at respective blocks 816, 818 may be performed in a variety of ways. For example, the routing table may be configured as the finger table 114 of FIG. 1 that utilizes a logarithmic function to describe a plurality of other nodes. The finger table 114 may be updated through probing the nodes that correspond to the entries. As previously described, the "fingers" of the finger table 114 of FIG. 1 form a broadcast graph with adequate redundancy such that the report will be distributed to nodes in the region, in which, the node resides. In another implementation, the fingers may also be utilized to broadcast the report to other nodes that lie outside the region.

Each node that receives the report may perform procedure 800 such that the events described in the report are broadcast to nodes referenced in finger tables included in each successive node. Thus, the events are disseminated through a broadcast graph defined by the fingers in the respective finger tables from the originating node to all other nodes by communicating the events. Once the events are received at the other nodes, the other nodes aid the originating node in distributing the events.

The events described in the reports may then be utilized by each of the nodes to update respective SSRTs included therein. Thus, the SSRTs may be utilized to reduce the number of hops needed to located desired data and reduce the amount of network bandwidth utilized to maintain the routing table.

Figure 9:
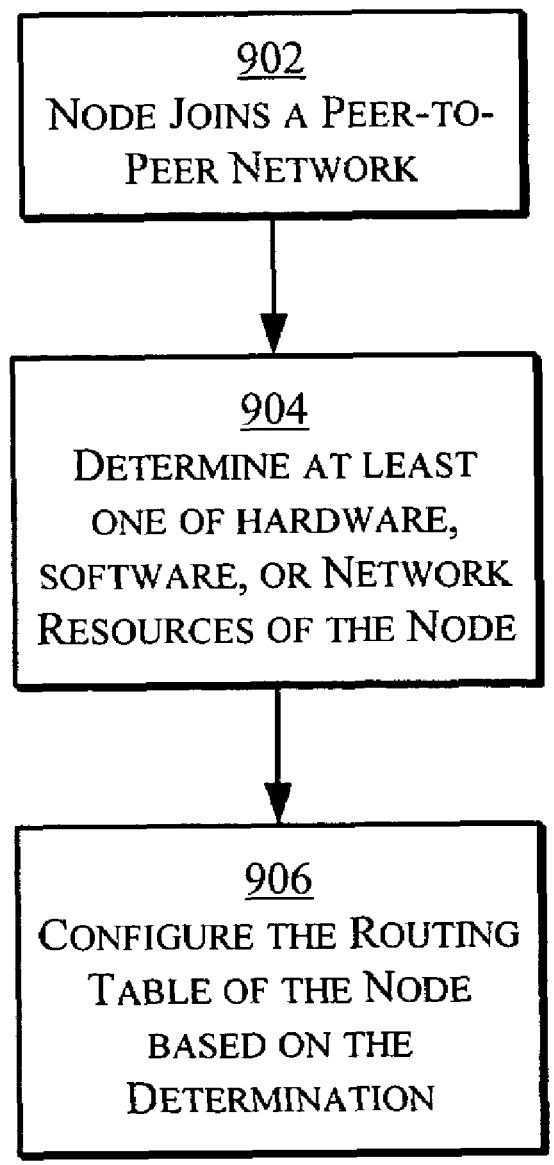
FIG. 9 is a flow diagram depicting a procedure in an exemplary implementation in which routing table size is dynamically determined based on the available resources of the node.

FIG. 9 is a flow diagram depicting a procedure 900 in an exemplary implementation in which routing table size is dynamically determined based on the available resources of the node. In some implementations of a peer-to-peer network, each of the nodes of the network may not have access to equal hardware, software, and/or network resources. For example, as shown in FIG. 1 computing device 104(B) may have a significant amount of hardware and software resources while computing device 104(1) may have limited hardware and software resources because computing device 104(1) is designed for portability. Additionally, nodes may have different bandwidths for connecting to the network, such as one node may utilize a dial-up connection while another node may utilize a digital subscriber line (DSL). The routing tables of each of these nodes may be dynamically configured based on the available resources of the node such that the node is configured to handle routing in the peer-to-peer network in a way that is consistent with its available resources.

At block 902, for instance, a node joins a peer-to-peer network. For example, the node may generate a random identifier as previously described. At block 904, the node determines its available hardware, software, and/or network resources. For instance, the node may execute a software module that determines the processing and memory capabilities of the node. The software module, when executed, may also determine the available bandwidth of the network connection, such as by determining an amount of time it takes to receive a response from a known network destination, and so on.

At block 906, the routing table of the node is configured based on the determination of resources (block 904). In one example, the software module may store a variety of thresholds which describe an amount of entries that may be included in the routing table based on the bandwidth of the network connection. For instance, if the node is connected via a dial-up connection, the routing table may be configured to have fewer entries than if the node was connected via a cable modem.

In another example, the software module may compare the available hardware, software, and/or network resources of the node with other nodes in the network to arrive at a routing table size that is in accordance with other routing table sizes in the peer-to-peer network. For instance, when the node joins the peer-to-peer network the node may locate a successor node as previously described. When located, the node may query the successor node to determine a routing table size that was constructed based on the hardware, software, and/or network resources of the successor node. The node may then compare its available resources with those of the successor node and configure a routing table to have a number of entries based on the comparison. For example, if the node has greater resources than the successor node, the node may configure the routing table to have more entries than the routing table of the successor node. A variety of algorithms may be employed to compare resources and configure routing tables accordingly.

Additionally, the routing table may be reconfigured at periodic intervals when the node is a member of the peer-to-peer network. For example, the node may make periodic determinations of resources while the node is a member of the peer-to peer network. Thus, routing tables may be constructed to reflect the available resources of a corresponding node in a peer-to-peer network and may be maintained to reflect to the current available resource of the node while the node is a member of the peer-to-peer network.

Exemplary Computing Device

Figure 10:
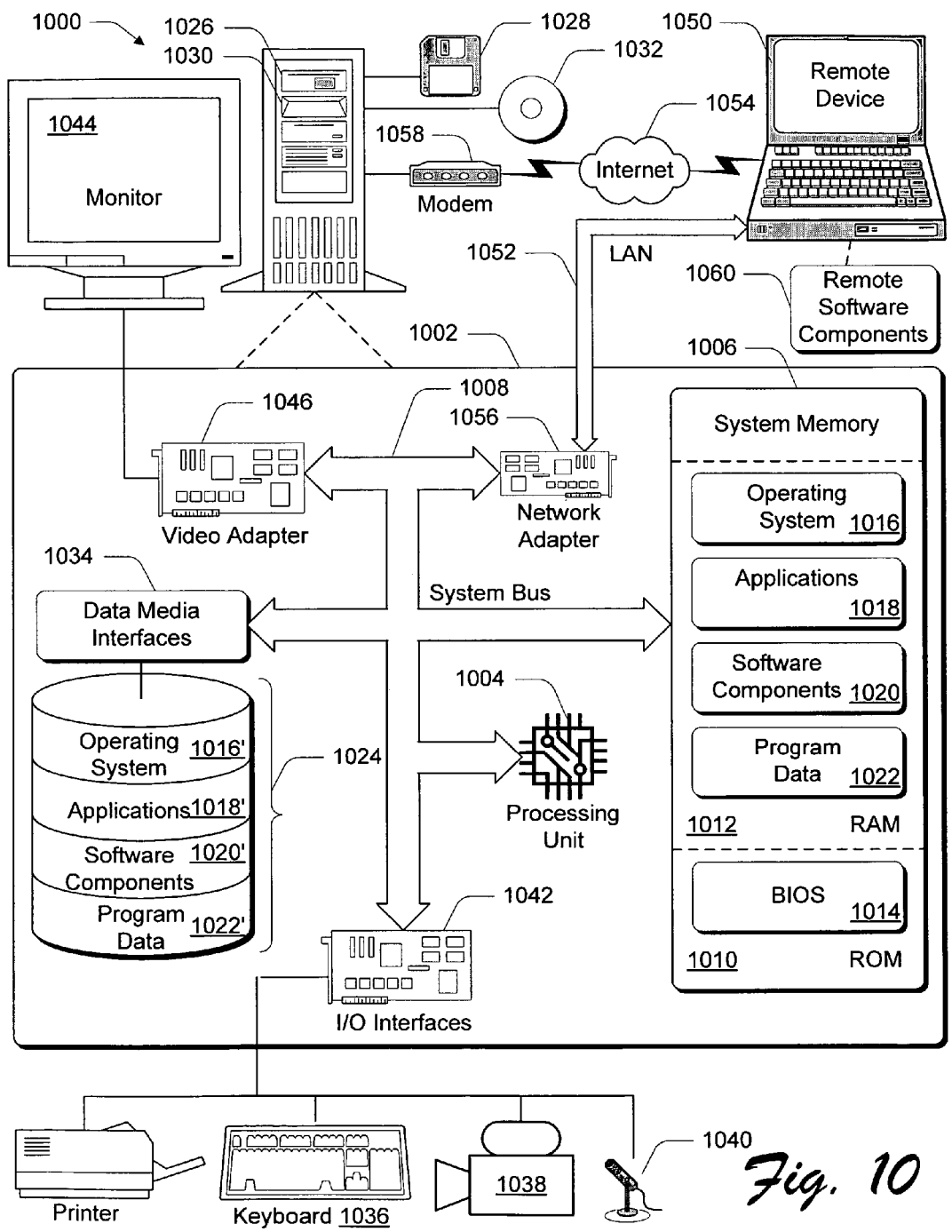
FIG. 10 is an illustration of an exemplary computing device that may be utilized to provide a node in a peer-to-peer network.

The various components and functionality described herein are implemented with a number of individual computers. FIG. 10 shows components of a typical example of a computer environment 1000, including a computer, referred by to reference numeral 1002, that is suitable to supply a node in a peer-to-peer network. The computer 1002 may be the same as or different from the plurality of clients 102(*a*) and the plurality of computing devices 104(1)-104(B) of FIG. 1. The components shown in FIG. 10 are only examples, and are not intended to suggest any limitation as to the scope of the functionality of the invention; the invention is not necessarily dependent on the features shown in FIG. 10.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, network-ready devices, minicomputers, mainframe computers, distributed computing environments that include any of the above systems or devices, and the like.

The functionality of the computers is embodied in many cases by computer-executable instructions, such as software components, that are executed by the computers. Generally, software components include routines, programs, objects, components, data structures, and so on, that perform particular tasks or implement particular abstract data types. Tasks might also be performed by remote processing devices that are linked through a communications network. In a distributed computing environment, software components may be located in both local and remote computer storage media.

The instructions and/or software components are stored at different times in the various computer-readable media that are either part of the computer or that can be read by the computer. Programs are typically distributed, for example, on floppy disks, CD-ROMs, DVD, or other form of non-transitory media or memory device. From there, they are installed or loaded into the secondary memory of a computer. At execution, they are loaded at least partially into the computer's primary electronic memory.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 10, the components of computer 1002 may include, but are not limited to, a processing unit 1004, a system memory 1006, and a system bus 1008 that couples various system components including the system memory to the processing unit 1004. The system bus 1008 may be any of several types of bus structures including a memory bus or memory controller, a peripheral bus, and a local bus using any of a variety of bus architectures.

Computer 1002 typically includes a variety of computer-readable media. Computer-readable media can be any available media that can be accessed by computer 1002 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital video discs (DVD) or other optical disk storage, magnetic cassettes, magnetic tape, magnetic disk storage or other magnetic storage devices, or any other medium which can be used to store the desired information and which can be accessed by computer 1002. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 1006 includes computer storage media in the form of volatile and/or nonvolatile memory such as read only memory (ROM) 1010 and random access memory (RAM) 1012. A basic input/output system 1014 (BIOS), containing the basic routines that help to transfer information between elements within computer 1002, such as during start-up, is typically stored in ROM 1010. RAM 1012 typically contains data and/or software components that are immediately accessible to and/or presently being operated on by processing unit 1004. By way of example, and not limitation, FIG. 10 illustrates operating system 1016, applications 1018, software components 1020, and program data 1022.

The computer 1002 may also include other removable/non-removable, volatile/nonvolatile computer storage media. By way of example only, FIG. 10 illustrates a hard disk drive 1024 that reads from or writes to non-removable, nonvolatile magnetic media, a magnetic disk drive 1026 that reads from or writes to a removable, nonvolatile magnetic disk 1028, and an optical disk drive 1030 that reads from or writes to a removable, nonvolatile optical disk 1032 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1024 is typically connected to the system bus 1008 through a non-removable memory interface such as data media interface 1034, and magnetic disk drive 1026 and optical disk drive 1030 are typically connected to the system bus 1008 by a removable memory interface.

The drives and their associated computer storage media discussed above and illustrated in FIG. 10 provide storage of computer-readable instructions, data structures, software components, and other data for computer 1002. In FIG. 10, for example, hard disk drive 1024 is illustrated as storing operating system 1016', applications 1018', software components 1020', and program data 1022'. Note that these components can either be the same as or different from operating system 1016, applications 1018, software components 1020, and program data 1022. Operating system 1016', applications 1018', software components 1020', and program data 1022' are given different numbers here to illustrate that, at a minimum, they are different copies. A user may enter commands and information into the computer 1002 through input devices such as a keyboard 1036, and pointing device (not shown), commonly referred to as a mouse, trackball, or touch pad. Other input devices may include source devices (such as a microphone 1038 or camera 1040 which provide streaming data), joystick, game pad, satellite dish, scanner, or the like. These and other input devices are often connected to the processing unit 1002 through an input/output (I/O) interface 1042 that is coupled to the system bus, but may be connected by other interface and bus structures, such as a parallel port, game port, or a universal serial bus (USB). A monitor 1044 or other type of display device is also connected to the system bus 1008 via an interface, such as a video adapter 1046. In addition to the monitor 1044, computers may also include other rendering devices (e.g., speakers) and one or more printers, which may be connected through the I/O interface 1042.

The computer may operate in a networked environment using logical connections to one or more remote computers, such as a remote device 1050. The remote device 1050 may be a personal computer, a network-ready device, a server, a router, a network PC, a peer device or other common network node, and typically includes many or all of the elements described above relative to computer 1002. The logical connections depicted in FIG. 10 include a local area network (LAN) 1052 and a wide area network (WAN) 1054. Although the WAN 1054 shown in FIG. 10 is the Internet, the WAN 1054 may also include other networks. Such networking environments are commonplace in offices, enterprise-wide computer networks, intranets, and the like.

When used in a LAN networking environment, the computer 1002 is connected to the LAN 1052 through a network interface or adapter 1056. When used in a WAN networking environment, the computer 1002 typically includes a modem 1058 or other means for establishing communications over the Internet 1054. The modem 1058, which may be internal or external, may be connected to the system bus 1008 via the I/O interface 1042, or other appropriate mechanism. In a networked environment, program modules depicted relative to the computer 1002, or portions thereof, may be stored in the remote device 1050. By way of example, and not limitation, FIG. 10 illustrates remote software components 1060 as residing on remote device 1050. It will be appreciated that the network connections shown are exemplary and other means of establishing a communications link between the computers may be used.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   storing, in a non-transitory memory communicatively coupled to a processor, processor-executable instructions for performing the method;
   executing the instructions on the processor;
   according to the instructions being executed:
   receiving at one of a plurality of nodes in a peer-to-peer network, an indication of a change in membership by another said node in the peer-to-peer network;
   updating, in response to the receipt of the indication, at least one soft state routing table entry in a soft state routing table (SSRT) having a plurality of said SSRT entries, each referencing a corresponding node from among said plurality of nodes, wherein the said SSRT entries describe a current membership of the system;
   broadcasting a report that describes the change to each said node referenced in an SSRT used by the one said node, wherein the report is only formed after aggregating a plurality of said indications received from two or more nodes indicating a change in membership of the two or more nodes;
   maintaining a finger table having a plurality of finger table entries, wherein the SSRT is a finger table having a plurality of finger table entries, wherein each said finger table entry references successively farther nodes by following a logarithmic function, wherein the logarithmic function is a prefix routing algorithm of the form log(N) where N is a total number of nodes in the peer-to-peer network;
   updating a leafset table that defines a hash space for the node, the hash space having information about resources provided in the peer-to-peer network, the leafset table enabling a guarantee of the integrity of a key space of the network and
   giving priority to node-leaving indications over node-joining indications.

2. The method as described in claim 1, wherein the indication is a join or leave event regarding the other said node in the peer-to-peer network, and wherein the report is broadcast to every node in the routing table in parallel at a pre-defined broadcast interval.

3. The method as described in claim 1, further comprising forming the report by determining whether the indication has previously been received by the one said node, and if not, including the indication in the report, and wherein a reference to a successively farther node in the finger table is found by flipping a bit of a node identifier and using a result of flipping the bit to acquire an address to another node and pointing to the another node.

4. The method as described in claim 1, wherein the routing table does not reference at least one other said node of the plurality of nodes, and wherein each node maintains a plurality of routing tables where each routing table comprises a different hierarchy of nodes where each hierarchy is a different set of nodes with a different set of similar addresses.

5. The method as described in claim 1, wherein the broadcasting is performed when a predetermined broadcast time has been reached, and wherein the report is only broadcast to approximately $\log b(N)$ number of nodes where N is the total number of nodes in the peer-to-peer network and where b is any number.

6. The method as described in claim 1, wherein each said node is provided by a computing device, wherein the leafset table defines a plurality of zones, wherein resources are associated with keys, wherein a key is hashed to find a particular zone of the plurality of zones, each zone representing a portion of the total resources shared in the network, and wherein the DHT stores key and value pairs.

7. In a node configured for inclusion in a peer-to-peer network, the network having a plurality of said nodes, a method comprising:
   storing, in a non-transitory memory communicatively coupled to a processor, processor-executable instructions for performing the method;
   executing the instructions on the processor;
   according to the instructions being executed:
   receiving, at the node, an indication broadcast by another said node;
   updating, in response to the receipt of the indication, at least one soft state routing table entry in a soft state routing table (SSRT) having a plurality of said SSRT entries each referencing a corresponding said node, wherein the said SSRT entries describe the current membership of the system;
   updating a leafset table that defines a hash space for the node, the hash space having information about resources provided in the peer-to-peer network, the leafset table enabling a guarantee of the integrity of a key space of the network;
   maintaining the leafset table by periodically probing at least one other said node; and
   maintaining a finger table having a plurality of finger table entries, wherein each said finger table entry describes a location of a corresponding node, wherein each said finger table entry references a successive node by following a logarithmic function, wherein the logarithmic function is a prefix routing algorithm of the form log(N) where N is a total number of nodes in the peer-to-peer network, wherein the finger table is maintained by probing each said corresponding node referenced in the finger table entries of the finger table, and wherein node-leaving indications are given priority over node-joining indications.

8. The method as described in claim 7, wherein the indication is a join or leave event.

9. The method as described in claim 7, wherein the indication is broadcast by the other said node after examining a finger table, and wherein the indication is broadcast a fixed number of times in addition to a first time to provide redundancy and communicating less than a predetermined number of events over a given period of time.

10. The method as described in claim 9, further comprising:
determining whether each said indication has previously been received by the node, and if not, performing the updating; and
queuing each said indication in a queue if the predetermined number of events have already been communicated over the given period of time, and sending each said indication which has been queued after the expiration of the given period of time.

11. A method comprising:
storing, in a non-transitory memory communicatively coupled to a processor, processor-executable instructions for performing the method;
executing the instructions on the processor;
according to the instructions being executed:
determining, on a node for inclusion in a peer-to-peer network, available resources of the node for communicating in the peer-to-peer network when the node joins the network, wherein the resources are at least one of hardware, software, or network resources of the node;
determining at periodic intervals available resources of at least one other node in the peer-to-peer network; and
forming a routing table on the node, based on the determination of available resources of the node and the at least one other node, for routing requests in the peer-to-peer network, wherein the forming comprises deriving a number of entries in the routing table based on the determination, and wherein the number of entries in the routing table is based on the resources of the node;
updating a leafset table that defines a hash space for the node, the hash space having information about resources provided in the peer-to-peer network, the leafset table enabling a guarantee of integrity of a key space of the network;
maintaining the leafset table by periodically probing at least one other node; and
maintaining a finger table having a plurality of finger table entries, wherein each said finger table entry describes a location of a corresponding node, wherein each said finger table entry references a successive node by following a logarithmic function, wherein the logarithmic function is a prefix routing algorithm of the form log(N) where N is a total number of nodes in the peer-to-peer network, and wherein node-leaving indications are given priority over node-joining indications.

12. The method as described in claim 11, wherein the number of entries in the routing table is also based on the resources of the at least one other node.

13. A non-transitory computer-readable media comprising computer executable instructions that, when executed by a computer, direct the computer to perform a method, the method comprising:
storing, in the non-transitory computer-readable memory, communicatively coupled to a processor, processor-executable instructions for performing the method;
executing the instructions on the processor;
according to the instructions being executed:
determine when a change in membership in a peer-to-peer network has occurred with respect to one or more of a plurality of nodes, wherein the plurality of nodes in the network employ a distributed hash table for dividing a resource space provided by the plurality of nodes into a plurality of zones; and
when the change has occurred, broadcast a report to a subset of the plurality of nodes, wherein:
the report describes the change in membership; and
the subset is established by examining a routing table that references each said node in the subset, wherein the routing table is configured as a finger table having a plurality of finger table entries, each said finger table entry describing a location of a corresponding successively farther node by following a logarithmic function, wherein the logarithmic function is a prefix routing algorithm of the form log(N) where N is a total number of nodes in the peer-to-peer network, and wherein node-leaving indications are given priority over node-joining indications;
updating a leafset table that defines a hash space for the node, the hash space having information about resources provided in the peer-to-peer network, the leafset table enabling a guarantee of the integrity of a key space of the network; and
maintaining the leafset table by periodically probing at least one other said node.

14. The non-transitory computer-readable media as described in claim 13, wherein the table is maintained by probing each said node referenced in the subset.

15. A system comprising a plurality of nodes arranged in a peer-to-peer network each including a processor for executing computer instructions, comprising:
a soft-state routing table (SSRT) within each of said nodes, each SSRT having a plurality of SSRT entries that reference a set of said nodes;
a leafset table that defines a hash space for resources provided in the peer-to-peer network, wherein the leafset table defines a hash space for the node, the hash space having information about resources provided in the peer-to-peer network, wherein the leafset table enables a guarantee of the integrity of a key space of the network, and wherein the leafset table is maintained by periodically probing at least one other said node;
a finger table having a plurality of finger table entries, wherein each said finger table entry references successively farther nodes by following a logarithmic function, wherein successively farther nodes are found by flipping a bit of a node identifier to find a successive node identifier and then pointing to a successive node having the successive node identifier, and wherein the logarithmic function is a prefix routing algorithm of the form log(N) where N is a total number of nodes in the peer-to-peer network, and wherein node-leaving indications are given priority over node-joining indications;
a reference on each said SSRT entry to a respective said node from the set of said nodes; and an update corresponding to each said SSRT entry, produced by execution of the computer instructions by the processor, upon receipt of an indication broadcast from at least one said node included in the set of said nodes.

16. The system as described in claim 15, wherein the indication is a join or leave event.

17. The system as described in claim 15, wherein the indication is configured for broadcast by the at least one said node by examining a finger table of the at least one said node.

18. A node for inclusion in a peer-to-peer network having a plurality of nodes, each of which is locatable via an identifier that is divisible into a plurality of blocks, a block being a segment of the identifier, the node comprising:
a processor; and
non-transitory memory, coupled to the processor and configured to maintain:

a leafset table that defines a hash space for resources provided in the peer-to-peer network, the leafset table enabling a guarantee of the integrity of a key space of the network.

19. The node as described in claim 18, wherein: the leafset table and the finger table are configured to be updated via probing; and the SSRT is configured to be updated via receipt of a broadcast of an indication from one or more said nodes referenced by the SSRT entries.

20. The node as described in claim 19, wherein the indication is configured for broadcast by at least one said node by examining a finger table included in the at least one said node.

21. The node as described in claim 18, wherein a number of the SSRT entries in the SSRT is determined based on available resources of the node compared with other said nodes in the peer-to-peer network.

* * * * *